US009008953B2

(12) United States Patent
Ma et al.

(10) Patent No.: US 9,008,953 B2
(45) Date of Patent: Apr. 14, 2015

(54) NAVIGATION SYSTEM WITH TURN RESTRICTION MECHANISM AND METHOD OF OPERATION THEREOF

(71) Applicant: TeleNav, Inc., Sunnyvale, CA (US)

(72) Inventors: Tuo Ma, Santa Clara, CA (US); Ronald David Gutman, San Jose, CA (US)

(73) Assignee: TeleNav, Inc., Sunnyvale, CA (US)

( * ) Notice: Subject to any disclaimer, the term of this patent is extended or adjusted under 35 U.S.C. 154(b) by 57 days.

(21) Appl. No.: 13/659,740

(22) Filed: Oct. 24, 2012

(65) Prior Publication Data
US 2013/0103293 A1 Apr. 25, 2013

Related U.S. Application Data

(60) Provisional application No. 61/550,898, filed on Oct. 24, 2011.

(51) Int. Cl.
| G06F 19/00 | (2011.01) |
| G06F 7/70 | (2006.01) |
| G06F 7/76 | (2006.01) |
| G01C 21/32 | (2006.01) |
| G01C 21/36 | (2006.01) |

(52) U.S. Cl.
CPC ............ *G01C 21/32* (2013.01); *G01C 21/3697* (2013.01)

(58) Field of Classification Search
CPC .............................. G08G 1/0133; G08G 1/056
USPC ........................................................... 701/118
See application file for complete search history.

(56) References Cited

U.S. PATENT DOCUMENTS

| 3,328,791 | A | * | 6/1967 | Casciato et al. ............... 340/915 |
| 3,663,937 | A | * | 5/1972 | Bolner .......................... 340/937 |
| 4,070,560 | A | * | 1/1978 | Blanyer ............................. 377/9 |
| 6,012,012 | A | * | 1/2000 | Fleck et al. ................... 701/117 |
| 6,564,145 | B2 |   | 5/2003 | Kim et al. |
| 6,950,788 | B2 | * | 9/2005 | Faghri .............................. 703/8 |
| 7,124,199 | B2 |   | 10/2006 | Miller et al. |
| 8,050,854 | B1 | * | 11/2011 | Chandra et al. ............... 701/117 |
| 8,103,436 | B1 | * | 1/2012 | Chandra et al. ............... 701/117 |
| 2005/0151846 | A1 | * | 7/2005 | Thornhill ....................... 348/149 |
| 2006/0235612 | A1 | * | 10/2006 | Wilbrod ......................... 701/210 |
| 2008/0172171 | A1 | * | 7/2008 | Kowalski ....................... 701/118 |
| 2008/0218380 | A1 | * | 9/2008 | Wall et al. ...................... 340/907 |
| 2011/0213548 | A1 | * | 9/2011 | Tashiro .......................... 701/201 |

* cited by examiner

*Primary Examiner* — Behrang Badii
*Assistant Examiner* — Daniel L Greene
(74) *Attorney, Agent, or Firm* — IP Investment Law Group

(57) ABSTRACT

A method of operation of a navigation system includes: generating a travel trace for identifying a traffic direction flowing through an intersection; generating a trace count based on aggregating the plurality of the travel trace; calculating an expected turn count based on the trace count for estimating an out-edge traffic flowing from an in-edge traffic; and determining a turn restriction based on the expected turn count for identifying the turn restriction at the intersection for displaying on a device.

20 Claims, 9 Drawing Sheets

NAVIGATION SYSTEM WITH TURN RESTRICTION MECHANISM AND METHOD OF OPERATION THEREOF

CROSS-REFERENCE TO RELATED APPLICATION(S)

This application claims the benefit of U.S. Provisional Patent Application Ser. No. 61/550,898 filed Oct. 24, 2011, and the subject matter thereof is incorporated herein by reference thereto.

TECHNICAL FIELD

The present invention relates generally to a navigation system, and more particularly to a system with a turn restriction mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without a turn restriction mechanism has become a paramount concern for the consumer. The inability decreases the benefit of using the tool.

Thus, a need still remains for a navigation system with the turn restriction mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a travel trace for identifying a traffic direction flowing through an intersection; generating a trace count based on aggregating the plurality of the travel trace; calculating an expected turn count based on the trace count for estimating an out-edge traffic flowing from an in-edge traffic; and determining a turn restriction based on the expected turn count for identifying the turn restriction at the intersection for displaying on a device.

The present invention provides a navigation system, including: a trace generator module for generating a travel trace for identifying a traffic direction flowing through an intersection; a count module, coupled to the trace generator module, for generating a trace count based on aggregating the plurality of the travel trace; a turn count module, coupled to the count module, for calculating an expected turn count based on the trace count for estimating an out-edge traffic flowing from an in-edge traffic; and a restriction determinator module, coupled to the turn count module, for determining a turn restriction based on the expected turn count for identifying the turn restriction at the intersection for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
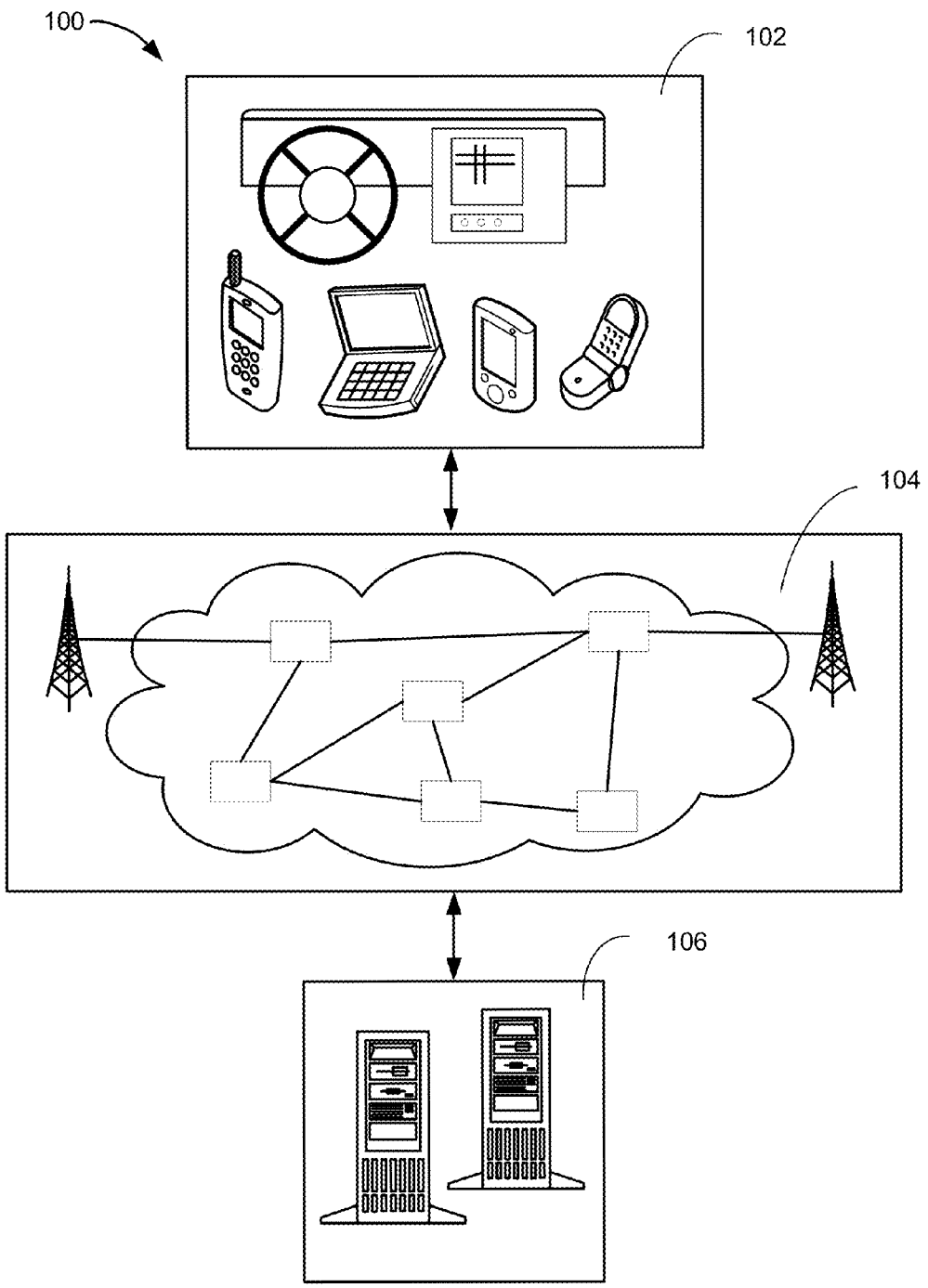
FIG. 1 is a navigation system with a turn restriction mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with a turn restriction mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
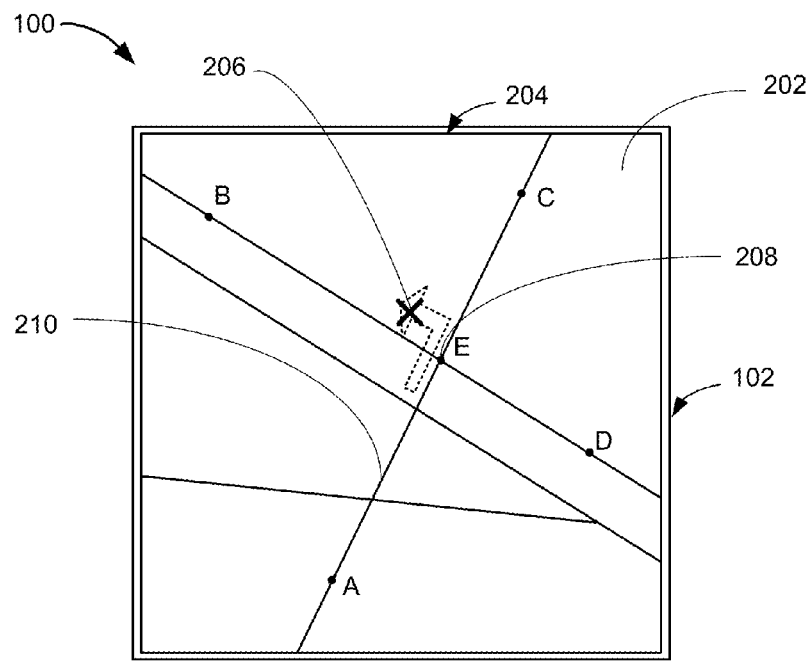
FIG. 2 is a first example of a default map displayed on a display interface of the first device.

Referring now to FIG. 2, therein is shown a first example of a default map 202 displayed on a display interface 204 of the first device 102. The default map 202 can represent an Open Street Map (OSM)™. For example, OSM can represent a map data (OSM data) developed by a collaborative, open source project to develop free geographic data. The OSM data can represent incomplete information of the geographic area. For example, the incomplete information can represent the default map 202 failing to disclose a turn restriction 206 at an intersection 208. Further, the default map 202 can fail to disclose the turn restriction 206 at the intersection 208 even though the intersection 208 in a real world can have the turn restriction 206 of "no left turn." The failure can be illustrated by having the arrow sign dotted.

The intersection 208 can represent a geographic location where a plurality of a road segment 210 join or cross each other. The intersection 208 can be represented as a point E on the default map 202. The road segment 210 can represent a road that connects to the intersection 208 from point A to point E.

The turn restriction 206 is defined as a limitation placed on traveling through the intersection 208. For example, the turn restriction 206 can represent a "no left turn." As a result of the turn restriction 206, traveling from point A to point B can be prohibited. The navigation system 100 can update the default map 202 to include the turn restriction 206 at the intersection 208 to reflect the turn restriction 206 as placed in the real world. Details will be discussed below.

Figure 3:
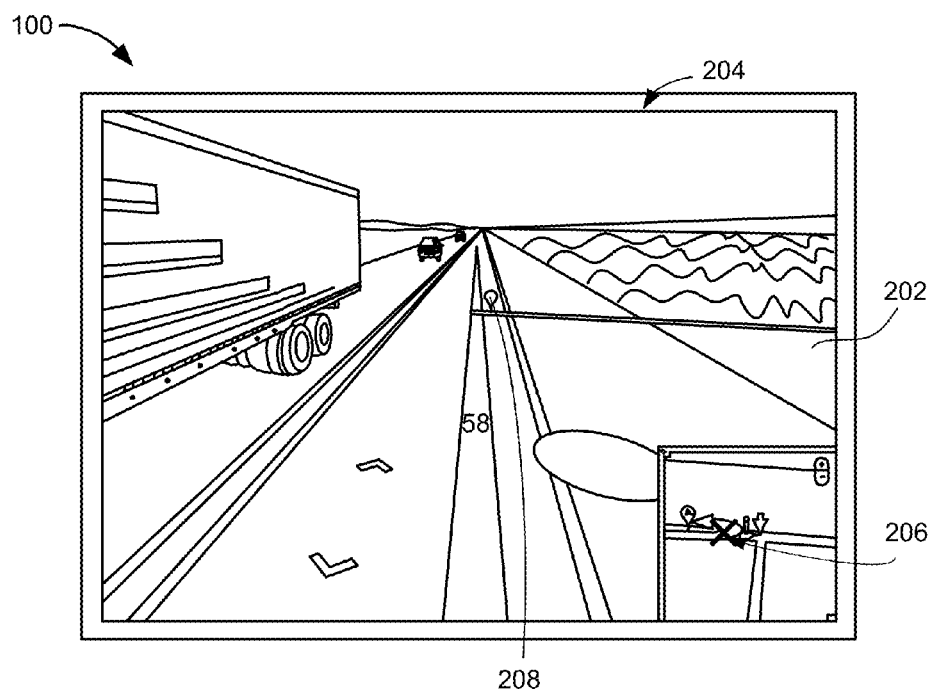
FIG. 3 is a second example of the intersection on the default map displayed on the display interface of the first device.

Referring now to FIG. 3, therein is shown a second example of the intersection 208 on the default map 202 displayed on the display interface 204 of the first device 102. In this example, the figure depicts a dirt road ending into a paved road. The intersection 208 can represent the geographic location where the dirt road meeting the paved road.

The paved road can be divided by a double center lane, prohibiting the vehicles from making a U-turn on the paved road. However, the default map 202 can display a navigation guidance permitting a U-turn on the paved road. The navigation system 100 can update the default map 202 to include the turn restriction 206 on the paved road to reflect the turn restriction 206 as placed in the real world. Details will be discussed below.

the travel record for traveling in the in-edge traffic 402 from point A to point E. For another example, the travel trace 410 can represent a GPS trace of for traveling in the out-edge traffic 404 from point E to point D. For a different example, the travel trace 410 can represent the GPS trace for traveling from point A to point E to point D.

The travel activity record 408 can include a trace count 412, which is defined as an aggregation of the travel trace 410. For example, the trace count 412 can represent a total number of the travel trace 410 representing the in-edge traffic 402. For a specific example, the trace count 412 can represent 500 records of the travel trace 410 for traveling from point A to point E. For another example, the trace count 412 for traveling from point E to point D can represent 70 records of the travel trace 410. For a different example, the trace count 412 for traveling from point A to point E back to point A of 0 record. For further example, the trace count 412 for traveling from point A to point E to point D of 570 records.

The navigation system 100 can aggregate the travel trace 410 of the in-edge traffic 402 and the out-edge traffic 404 for traveling from point A to point E to point D to generate the trace count 412. The travel activity record 408, such as a turn table below, can be generated to represent the trace count 412 from point A to point E to point B, C, D, or A.

|  | Turn direction number 420 | | | | | | | | | | | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 | 16 |
| Trace count 412 | 30 | 230 | 40 | 40 | 90 | 0 | 60 | 20 | 60 | 0 | 0 | 60 | 260 | 40 | 10 | 60 |

Figure 4:
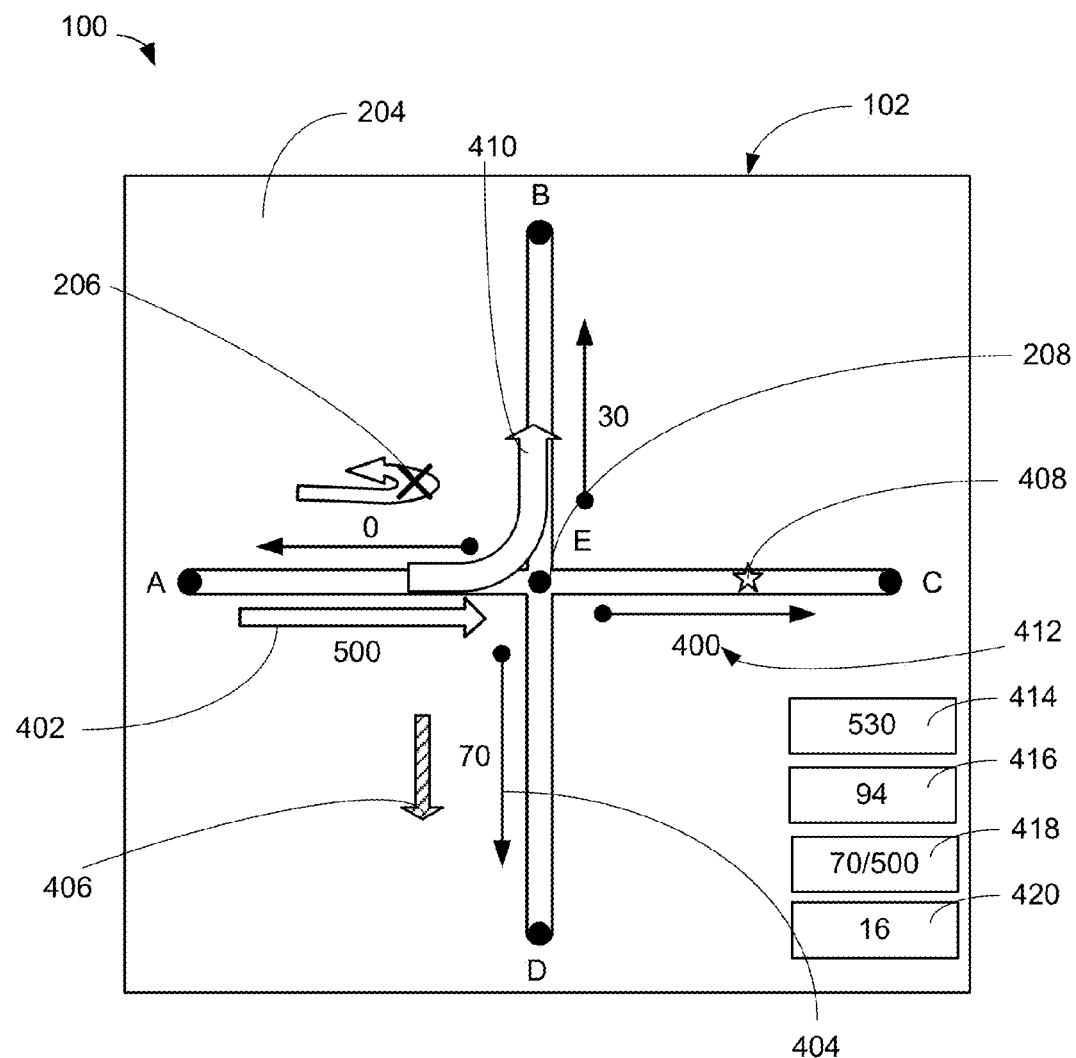
FIG. 4 is an example of the intersection displayed on the display interface of the first device.

Referring now to FIG. 4, therein is shown an example of the intersection 208 displayed on the display interface 204 of the first device 102. An in-edge traffic 402 and an out-edge traffic 404 can meet at the intersection 208. The in-edge traffic 402 is defined as a traffic flow with a traffic direction 406 heading into the intersection 208. The out-edge traffic 404 is defined as a traffic flow with the traffic direction 406 heading out from the intersection 208. The traffic direction 406 is defined as a course of traffic showing where the traffic flow is heading towards. For illustrative purposes, FIG. 4 depicts the traffic direction 406 heading out of the intersection 208, although it is understood that the traffic direction 406 can depict the traffic flow in other directions.

For example, FIG. 4 can illustrate the intersection 208 with the in-edge traffic 402 having the traffic direction 406 from point A to point E. Further, the intersection 208 can have the out-edge traffic 404 having the traffic direction 406 from point E to point B, from point E to point C, and from point E to point D.

The navigation system 100 can collect a travel activity record 408. The travel activity record 408 can represent traffic information for vehicles traveling through the intersection 208. The travel activity record 408 can include a travel trace 410, which is defined as a travel path record or evidence. For example, the travel trace 410 can represent the travel record traveling through the intersection 208. The travel record can represent GPS data for specific GPS point, such as longitude and latitude. The travel trace 410 can represent the linking or concatenation of a plurality of the GPS point to form a sequence of the GPS point.

More specifically, the travel trace 410 can represent the travel record of the in-edge traffic 402 and the out-edge traffic 404. For a specific example, the travel trace 410 can represent The turn table can represent 1000 instances of the trace count 412 for the traffic flowing through the intersection 208. The turn table can include a turn direction number 420 and the trace count 412. The turn direction number 420 can represent a label placed on a type of a turn with the traffic direction 406 possibly available at the intersection 208. For example, the intersection 208 can represent a 4 by 4. The 4 by 4 can represent the intersection 208 having 16 possible instances of the traffic direction 406. For a specific example, the traffic flow from point A to point E to point C can have the turn direction number 420 of "13" with the trace count 412 of "260." The trace count 412 for each instances of the turn direction number 420 can be collected. Further, the navigation system 100 can generate the trace count 412 for the in-edge traffic 402, the trace count 412 for the out-edge traffic 404, or a combination thereof based on the turn table.

In the case for traveling from point A to point E back to point A, from point A to point E can represent the in-edge traffic 402 while from point E to A can represent the out-edge traffic 404. For further example, the turn restriction 206 can represent a "no U-turn." As a result of the turn restriction 206, traveling from point A to point E back to point A can be prohibited. Subsequently, the trace count 412 for traveling from point A to point E back to point A can represent 0 record of the travel trace 410.

The 500 instances for the travel trace 410 for the in-edge traffic 402 can split into each instances of the out-edge traffic 404 from the intersection 208. For example, the trace count 412 from point E to point B can be 30. The trace count 412 from point E to point C can be 400. The trace count 412 from point E to point D can be 70. And the trace count 412 from point E to point A can be 0. The above records show that out of 500 instances of the travel trace 410 for the in-edge traffic 402 from point A to point E, 30 can represent a left turn at the intersection 208 to become the 30 instances of the travel trace 410 for the out-edge traffic 404 from point E to point B.

For further example, the trace count 412 for the out-edge traffic 404 from point E to point D is not necessarily an outflow from the trace count 412 for the in-edge traffic 402 from point A to point E. But rather, the trace count 412 from the out-edge traffic 404 from point E to point D can also include the outflow from the trace count 412 of the in-edge traffic 402 from point B to point E. More specifically, the out-edge traffic 404 from point E to point D can be 100 records. Out of the 100 records, 70 can come from the in-edge traffic 402 from point A to point E while 30 can come from the in-edge traffic 402 from point B to point E.

A total trace number 414 is defined as the aggregation of the trace count 412. For example, the total trace number 414 can be sum of all instances of the out-edge traffic 404 from the intersection 208. For example, the trace count 412 from point E to point B can be 30. The trace count 412 from point E to point C can be 400. The trace count 412 from point E to point D can be 100. And the trace count 412 from point E to point A can be 0. As a result, the total trace number 414 can be 530. The total trace number 414 can be greater than the in-edge traffic 402 of 500 instances of the travel trace 410 from point A to point E.

An expected turn count 416 is defined as an estimation of the number of the travel trace 410. For example, the expected turn count 416 can represent the estimation of how many instances of the travel trace 410 of the in-edge traffic 402 will end up in particular instance of the out-edge traffic 404. More specifically, if the trace count 412 for the in-edge traffic 402 can represent 500, 30 out of the 500 of the travel trace 410 of the in-edge traffic 402 can flow into the out-edge traffic 404 or from point A to point E to point B. In contrast, while the trace count 412 can represent an actual result of the traffic flow, the expected turn count 416 can represent a prediction that the travel trace 410 from the in-edge traffic 402 will end up in the particular instance of the out-edge traffic 404, such as from point E to point B. As a result, the expected turn count 416 can be greater, equal, or less than the trace count 412.

A turn proportion 418 is defined as a ratio between the trace count 412 of out-edge traffic 404 to the trace count 412 of the in-edge traffic 402. For example, the turn proportion 418 for from point A to point E to point D relative to from point A to point E can be 70 to 500 or 70/500.

Figure 5:
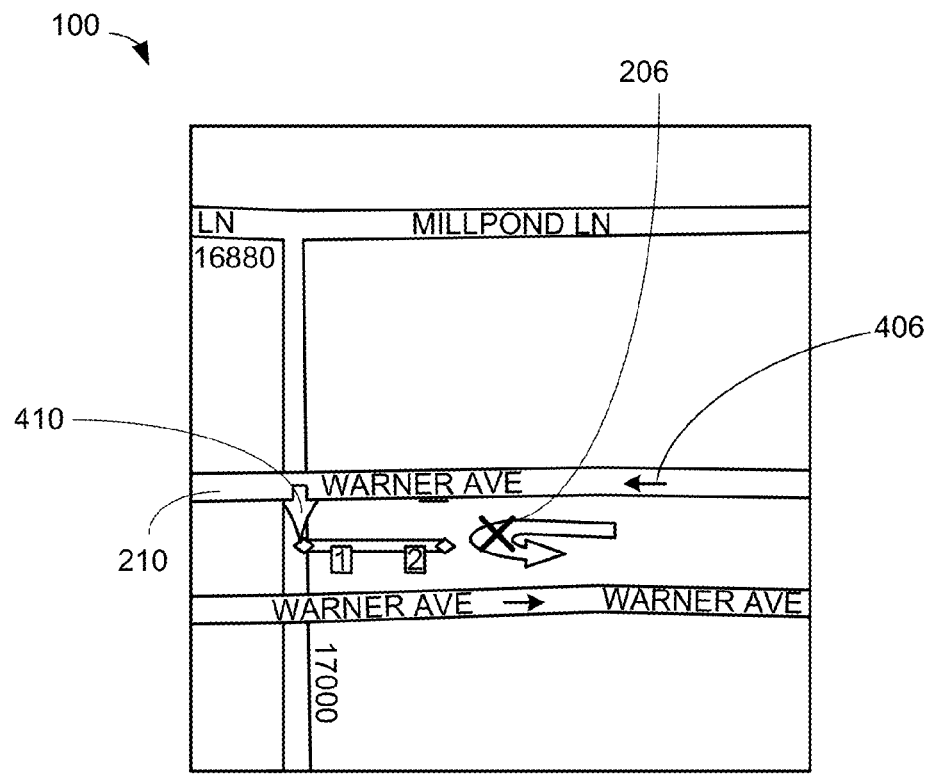
FIG. 5 is an example of the navigation system generating the travel trace.
Figure 5:
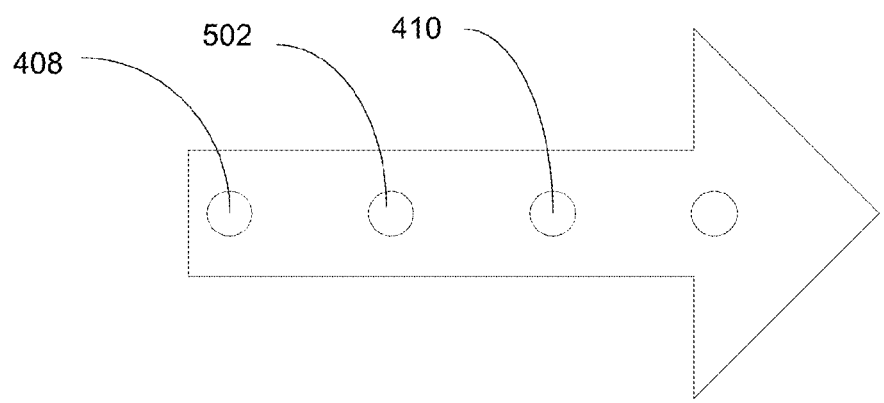

Referring now to FIG. 5, therein is shown an example of the navigation system 100 generating the travel trace 410. The upper portion of FIG. 5 is a third example illustrating a situation where there are two one-way roads representing a two way road. Each one-way road can have the traffic direction 406 that are opposite the other to illustrate a two way traffic of the road segment 210.

Depending on the travel trace 410 of vehicles traveling from one of these roads to the other using the road segment 210, the navigation system 100 can generate the turn restriction 206 to prohibit a U-turn like traversal from one of the one-way road of the road segment 210 to the other one-way road going the opposite direction on a same instance of the road segment 210. As another example, the navigation system 100 can analyze the travel trace 410 and generate the turn restriction 206 between the two one-way roads to restrict the U-turn on the road segment 210.

The lower portion of FIG. 5 depicts location data flow, such as a method of handling GPS data or the travel activity record 408. In a situation where the handling, filtering, or cleaning noise associated with GPS data is desired, this figure describes the process of cleaning the data, packaging the GPS points into a burst 502 (e.g. 1 point per second is packaged into 5 points per second). The burst 502 can represent a collection of GPS points. Further, the navigation system 100 can package or aggregate two or more instances of the burst 502 into the travel trace 410.

Figure 6:
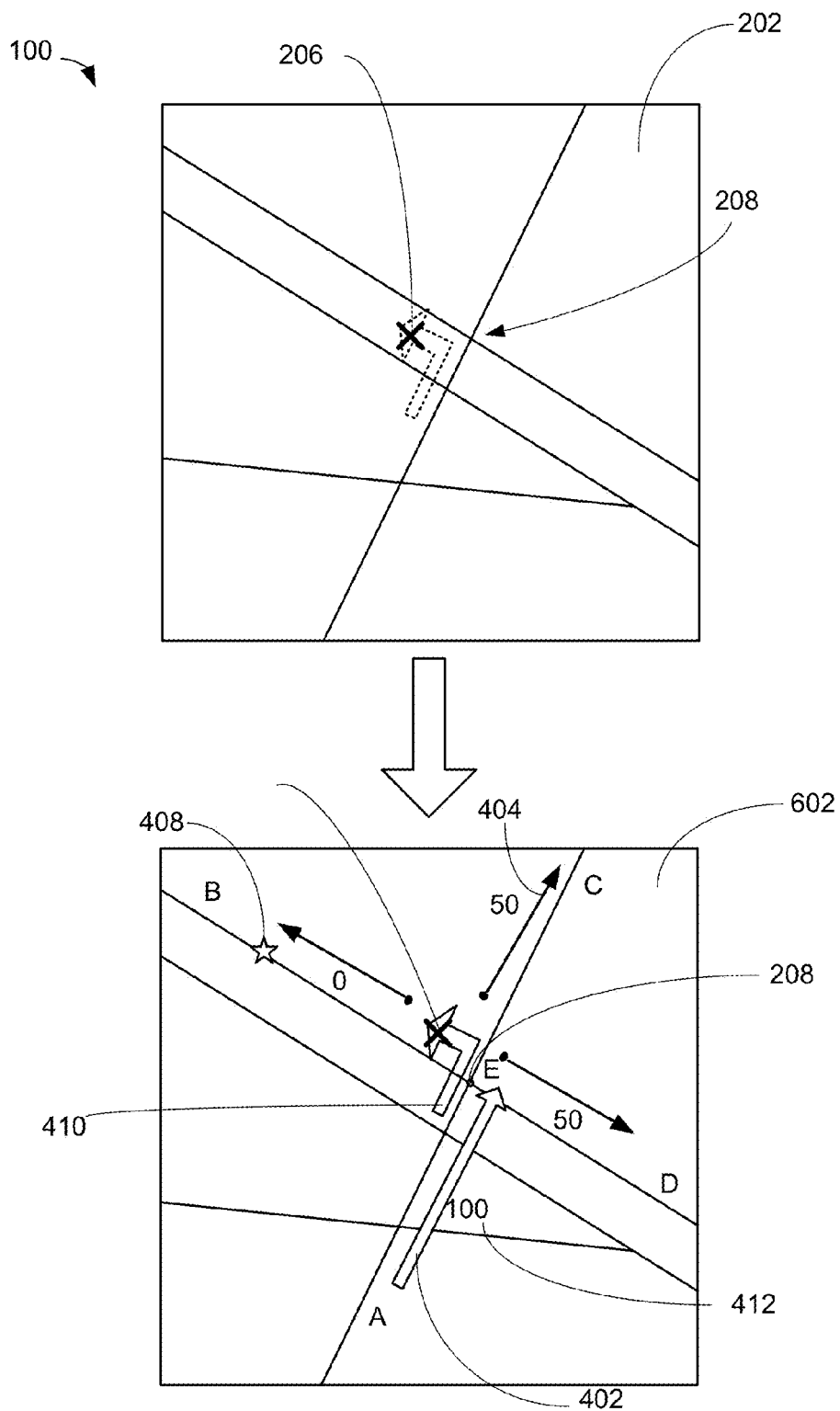
FIG. 6 is an example of the navigation system generating a trace supported map from the default map.

Referring now to FIG. 6, therein is shown an example of the navigation system 100 generating a trace supported map 602 from the default map 202. The trace supported map 602 is defined as a visual information of a geographic area augmented by the navigation system 100 based on the trace count 412.

For example, the navigation system 100 can collect the travel activity record 408 with the plurality of the travel trace 410. The trace count 412 for traveling on the in-edge traffic 402 from point A to point E of the intersection 208 can represent 100 records of the travel trace 410. The trace count 412 for traveling from point E to point D on the out-edge traffic 404 can represent 50 records of the travel trace 410.

In contrast, the trace count 412 for traveling from point E to point B can represent 0 record of the travel trace 410. Based on the trace count 412, the navigation system 100 can determine that the turn restriction 206 of "no left turn" existing at the intersection 208. Subsequently, the navigation system 100 can augment the default map 202 to generate the trace supported map 602. Details regarding the determination of the turn restriction 206 and the generation of the trace supported map 602 will be detailed below.

Figure 7:
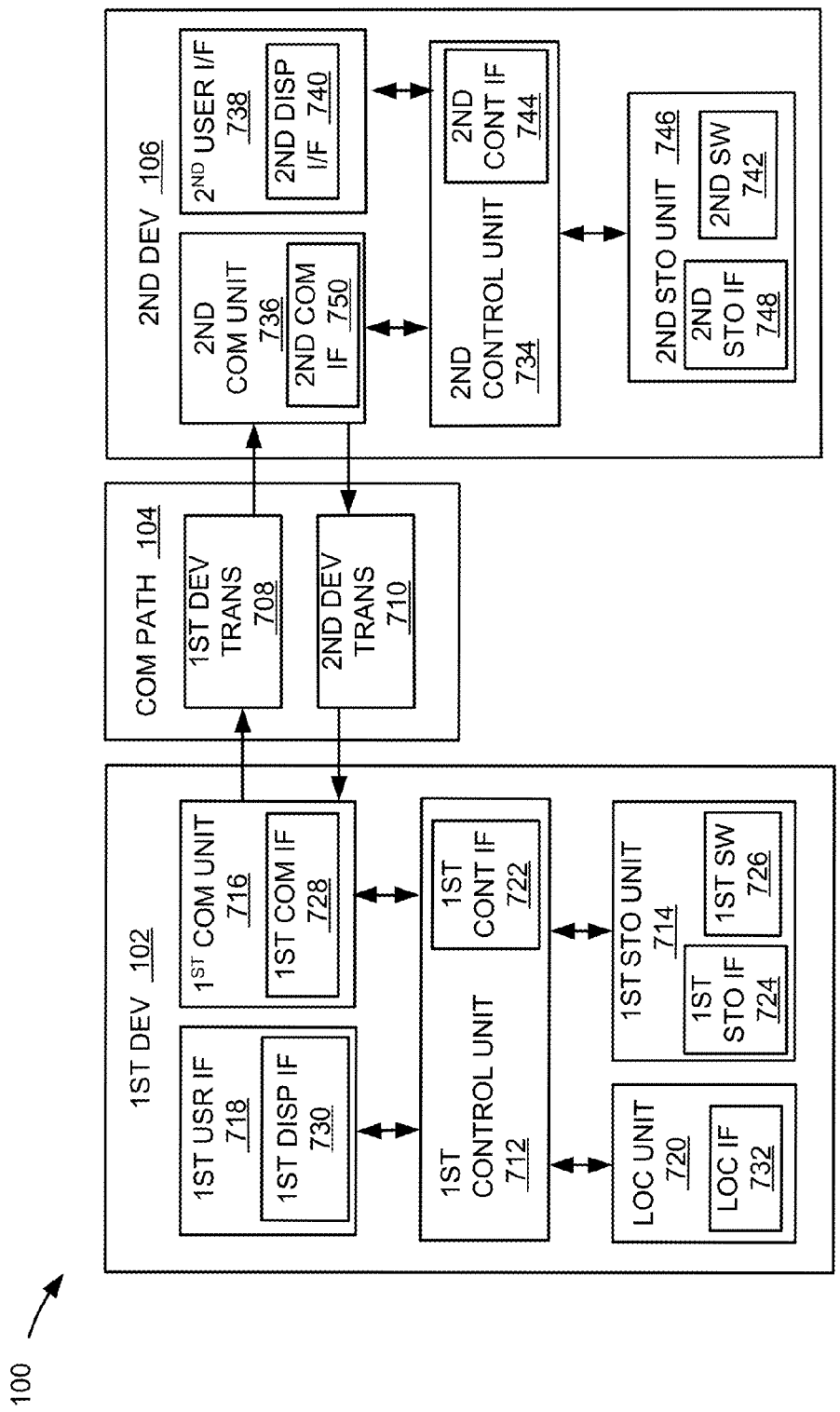
FIG. 7 is an exemplary block diagram of the navigation system.

Referring now to FIG. 7, therein is shown an exemplary block diagram of the navigation system 100. The navigation system 100 can include the first device 102, the communication path 104, and the second device 106. The first device 102 can send information in a first device transmission 708 over the communication path 104 to the second device 106. The second device 106 can send information in a second device transmission 710 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 712, a first storage unit 714, a first communication unit 716, a first user interface 718, and a location unit 720. The first control unit 712 can include a first control interface 722. The first control unit 712 can execute a first software 726 to provide the intelligence of the navigation system 100. The first control unit 712 can be implemented in a number of different manners. For example, the first control unit 712 can be a processor, an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations physically separate from the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The location unit 720 can generate location information, current heading, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations physically separate from the first device 102.

The location interface 732 can include different implementations depending on which functional units or external units are being interfaced with the location unit 720. The location interface 732 can be implemented with technologies and techniques similar to the implementation of the first control interface 722.

The first storage unit 714 can store the first software 726. The first storage unit 714 can also store the relevant information, such as advertisements, points of interest (POI), navigation routing entries, or any combination thereof.

The first storage unit 714 can be a volatile memory, a nonvolatile memory, an internal memory, an external memory, or a combination thereof. For example, the first storage unit 714 can be a nonvolatile storage such as non-volatile random access memory (NVRAM), Flash memory, disk storage, or a volatile storage such as static random access memory (SRAM).

The first storage unit 714 can include a first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations physically separate from the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. The first display interface 730 can include a display, a projector, a video screen, a speaker, or any combination thereof.

The first control unit 712 can operate the first user interface 718 to display information generated by the navigation system 100. The first control unit 712 can also execute the first software 726 for the other functions of the navigation system 100, including receiving location information from the location unit 720. The first control unit 712 can further execute the first software 726 for interaction with the communication path 104 via the first communication unit 716.

The second device 106 can be optimized for implementing the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the navigation system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the navigation system 100, including operating the second communication unit 736 to communicate with the first device 102 over the communication path 104.

The second control unit 734 can be implemented in a number of different manners. For example, the second control unit 734 can be a processor, an embedded processor, a microprocessor, a hardware control logic, a hardware finite state machine (FSM), a digital signal processor (DSP), or a combination thereof.

The second control unit 734 can include a second control interface 744. The second control interface 744 can be used for communication between the second control unit 734 and other functional units in the second device 106. The second control interface 744 can also be used for communication that is external to the second device 106.

The second control interface 744 can receive information from the other functional units or from external sources, or can transmit information to the other functional units or to external destinations. The external sources and the external destinations refer to sources and destinations physically separate from the second device 106.

The second control interface 744 can be implemented in different ways and can include different implementations depending on which functional units or external units are being interfaced with the second control interface 744. For example, the second control interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the navigation system 100 is shown with the second storage unit 746 as a single hierarchy storage system, although it is understood that the navigation system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as nonvolatile random access memory (NVRAM), Flash memory, disk storage, or a volatile storage such as static random access memory (SRAM).

The second storage unit 746 can include a second storage interface 748. The second storage interface 748 can be used for communication between the location unit 720 and other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations physically separate from the second device 106.

The second storage interface 748 can include different implementations depending on which functional units or external units are being interfaced with the second storage unit 746. The second storage interface 748 can be implemented with technologies and techniques similar to the implementation of the second control interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second control interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The navigation system 100 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 720, although it is understood that the second device 106 can also operate the location unit 720.

Figure 8:
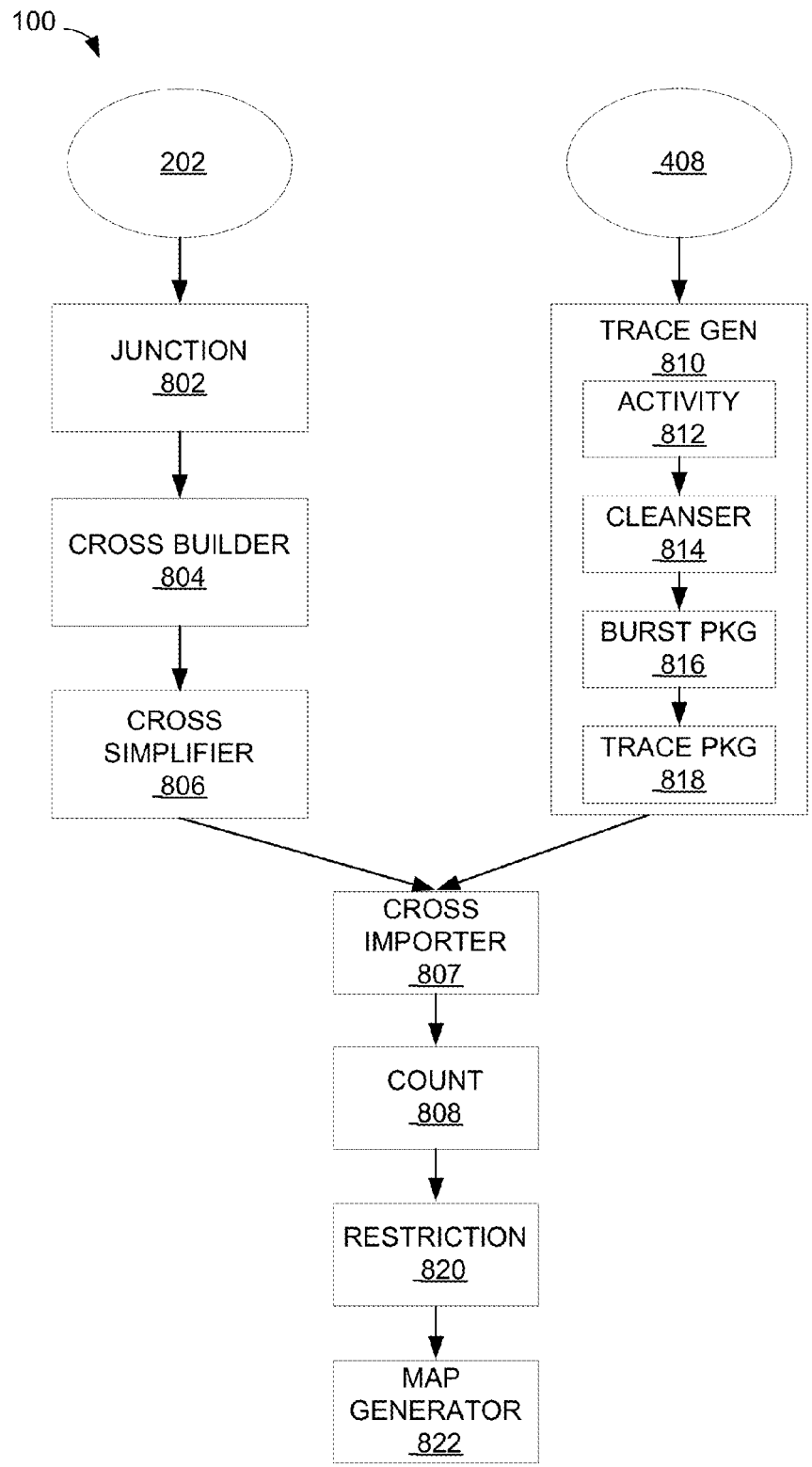
FIG. 8 is a control flow of the navigation system.

Referring now to FIG. 8, therein is shown a control flow of the navigation system 100. The navigation system 100 can include a junction module 802. The junction module 802 identifies the road segment 210 of FIG. 2 on the default map 202.

The junction module 802 can identify the road segment 210 in a number of ways. For example, the junction module 802 can identify the road segment 210 based on the OSM data provided within the default map 202. For another example, the junction module 802 can identify the plurality of the road segment 210 by identifying roads intersecting to form the intersection 208 of FIG. 2.

The navigation system 100 can include a cross builder module 804, which can be coupled to the junction module 802. The cross builder module 804 generates the intersection 208 based on the plurality of the road segment 210 intersecting with each other. The cross builder module 804 can generate the intersection 208 in a number of ways.

For example, the cross builder module 804 can generate the intersection 208 based on connecting the plurality of the road segment 210 having a lane. For another example, the cross builder module 804 can generate the intersection 208 based on identifying the plurality of the road segment 210 crossing one another. For further example, each instances of the road segment 210 can have a plurality of the lane. One instance of the road segment 210 can have the traffic direction 406 of FIG. 4 heading north/south and another instance of the road segment 210 having the traffic direction 406 heading east/west. The cross builder module 804 can generate the intersection 208 by having each instances of the lane heading north/south cross with another instances of the lane heading east/west to form the intersection 208. The cross builder module 804 can generate the intersection 208 by connecting each instances of the lane from one instance of the road segment 210 to each instances of the lane from another instance of the road segment 210. The cross builder module 804 can send the intersection 208 to a cross simplifier module 806.

The navigation system 100 can include the cross simplifier module 806, which can be coupled to the cross builder module 804. The cross simplifier module 806 simplifies the representation of the intersection 208. For example, the cross simplifier module 806 can simplify the representation of the intersection 208 by eliminating the lane as a factor for generate the intersection 208.

For a specific example, the cross simplifier module 806 can simplify the intersection 208 having the plurality of the lane connected to each other. More specifically, the road segment 210 can represent a two-way road. The two-way road can have two instances of the traffic direction 406 having the traffic flow heading the opposite direction from each other. For example, the road segment 210 can have the plurality of the lane with the traffic direction 406 heading north and the plurality of the lane with the traffic direction 406 heading south. The cross simplifier module 806 can combine each instances of the lane with the traffic direction 406 of north to generate one instance of the lane and combine each instances of the lane with the traffic direction 406 of south to generate another instance of the lane.

The cross simplifier module 806 can repeat the process for the plurality of the lane heading east and west. As a result, the cross simplifier module 806 can generate a simpler instance of the intersection 208 having one instance of the road segment 210 intersecting with another instance of the road segment 210 without the representation of the lane. The cross simplifier module 806 can send the intersection 208 simplified to a cross importer module 807.

The navigation system 100 can include a trace generator module 810. The trace generator module 810 generates the travel trace 410 of FIG. 4. For example, the trace generator module 810 can generate the travel trace 410 based on the travel activity record 408.

The trace generator module 810 can generate the travel trace 410 in a number of ways. The trace generator module 810 can include an activity module 812. The activity module 812 collects the travel activity record 408 detected. For example, the activity module 812 can collect the travel activity record 408 via the location unit 720 of FIG. 7. For a specific example, the activity module 812 can collect the travel activity record 408 related to the location information, current direction the first device 102 of FIG. 1 is heading, the current speed, or a combination thereof based on GPS information detected by the location unit 720. The activity module 812 can send the travel activity record 408 to a cleanser module 814.

The trace generator module 810 can include the cleanser module 814, which can be coupled to the activity module 812. The cleanser module 814 removes unnecessary information from the travel activity record 408 collected. For example, the cleanser module 814 can deduplicate the travel activity record 408.

The cleanser module 814 can deduplicate the travel activity record 408 in a number of ways. For example, the cleanser module 814 can deduplicate the travel activity record 408 by removing the GPS information with zero kilometers per hour or miles per hour from the travel activity record 408. For a different example, the cleanser module 814 can deduplicate the travel activity record 408 by removing the duplicate GPS information of the first device 102 for the same geographic location for the same time. For another example, the cleanser module 814 can deduplicate the travel activity record 408 by removing the nighttime GPS information and only keeping the daytime GPS information. The cleanser module 814 can send the travel activity record 408 that has been deduplicated to a burst package module 816.

The trace generator module 810 can include the burst package module 816, which can be coupled to the cleanser module 814. The burst package module 816 generates the burst 502 of FIG. 5. For example, the burst package module 816 can generate the burst 502 based on the plurality of the travel activity record 408.

For a specific example, the plurality of the travel activity record 408 can be collected for the first device 102. More specifically, the travel activity record 408 can represent the GPS information for a particular geographic location. The travel activity record 408 can represent one instance of GPS information per second.

The burst package module 816 can generate the burst 502 by packaging or aggregating the plurality of the travel activity record 408. Rather than transmitting each instance of the travel activity record 408 per each second, aggregating the plurality of the travel activity record 408 into the burst 502 allows the transmission of multiple instances of the travel activity record 408 per each second. For example, the burst 502 can represent five instances of GPS information per second. The burst package module 816 can send the burst 502 to a trace package module 818.

The trace generator module 810 can include the trace package module 818, which can be coupled to the burst package module 816. The trace package module 818 generates the travel trace 410. For example, the trace package module 818 can generate the travel trace 410 based on the plurality of the burst 502.

For a specific example, the trace package module 818 can generate the travel trace 410 by packaging or aggregating the burst 502. As discussed above, the burst 502 can represent the GPS information of the first device 102. When the user with the first device 102 is traveling along the road segment 210, the burst 502 can represent each instances of the GPS information of the geographic point on the road segment 210. The trace package module 818 can generate the travel trace 410 by packaging the burst 502 to predict the path taken by the user on the road segment 210. The trace package module 818 can send the travel trace 410 to the cross importer module 807.

The navigation system 100 can include the cross importer module 807, which can be coupled to the cross simplifier module 806 and the trace generator module 810. The cross importer module 807 maps the travel trace 410 to the default map 202 with the intersection 208. For example, the cross importer module 807 can map match the travel trace 410 by importing the travel trace 410 on to the default map 202. More specifically, the cross importer module 807 can map match mapping the longitude and latitude information of the travel trace 410 to the corresponding longitude and latitude location on the default map 202. The cross importer module 807 can send the default map 202 with the travel trace 410 to a count module 808.

The navigation system 100 can include the count module 808, which can be coupled to the cross importer module 807. The count module 808 generates the trace count 412 of FIG. 4. For example, the count module 808 can generate the trace count 412 based on aggregating the travel trace 410.

The count module 808 can generate the trace count 412 in a number of ways. For example, the count module 808 can generate the trace count 412 by aggregating the travel trace 410 for the in-edge traffic 402 of FIG. 4. More specifically, as illustrated in FIG. 4, the in-edge traffic 402 with the traffic direction 406 from point A to point E can be 500 instances of the travel trace 410. As a result, the trace count 412 can represent 500. For another example, the count module 808 can generate the trace count 412 by aggregating the travel trace 410 for the out-edge traffic 404 of FIG. 4 similarly as for the in-edge traffic 402. For further example, the count module 808 can generate the trace count 412 by aggregating the travel trace 410 for GPS traces from point A to point E to point D to be 570. The count module 808 can send the trace count 412 to a restriction module 820.

The navigation system 100 can include the restriction module 820, which can be coupled to the count module 808. The restriction module 820 determines the turn restriction 206 of FIG. 2. For example, the restriction module 820 can determine the turn restriction 206 based on the travel trace 410. Details regarding the determination will be discussed below. The restriction module 820 can send the turn restriction 206 to a map generator module 822.

The navigation system 100 can include a map generator module 822, which can be coupled to the restriction module 820. The map generator module 822 generates the trace supported map 602 of FIG. 6. For example, the map generator module 822 can generate the trace supported map 602 by importing the turn restriction 206 into the default map 202.

For a specific example, as discussed above, the default map 202 can fail to disclose the turn restriction 206 available in the real world. By importing the turn restriction 206 determined, the map generator module 822 can augment the default map 202 by including the turn restriction 206 for the intersection 208 that the default map 202 failed to disclose.

Further, the map generator module 822 can perform map matching to match the GPS information of the intersection 208 to the geographic location or any map data of the default map 202. By having the turn restriction 206 determined for the intersection 208, the turn restriction 206 can also be imported to the default map 202 to the matching geographic location on the default map 202. As a result, the map generator module 822 can generate the trace supported map 602 to include the turn restriction 206.

The physical transformation from traveling in the in-edge traffic 402 for one instance of the road segment 210 through the intersection 208 to another instance of the road segment 210 in the out-edge traffic 404 results in movement in the physical world, such as people using the first device 102, the vehicle, or a combination thereof, based on the operation of the navigation system 100. As the movement in the physical world occurs, the movement itself creates additional information that is converted back into the travel trace 410 for calculating the trace count 412 and the determination of the turn restriction 206 for the continued operation of the navigation system 100 and to continue the movement in the physical world.

The first software 726 of FIG. 7 of the first device 102 of FIG. 7 can include the modules for the navigation system 100. For example, the first software 726 can include the junction module 802, the cross builder module 804, the cross simplifier module 806, the trace generator module 810, the count module 808, the restriction module 820, and the map generator module 822.

The first control unit 712 of FIG. 7 can execute the first software 726 for the junction module 802 to identify the road segment 210. The first control unit 712 can execute the first software 726 for the cross builder module 804 to generate the intersection 208. The first control unit 712 can execute the first software 726 for the cross simplifier module 806 to generate the simpler instance of the intersection 208. The first control unit 712 can execute the first software 726 for the trace generator module 810 to generate the travel trace 410. The first control unit 712 can execute the first software 726 for the count module 808 to generate the trace count 412. The first control unit 712 can execute the first software 726 for the restriction module 820 to determine the turn restriction 206. The first control unit 712 can execute the first software 726 for the map generator module 822 to generate the trace supported map 602.

The second software 742 of FIG. 7 of the first device 106 of FIG. 7 can include the modules for the navigation system 100. For example, the second software 742 can include the junction module 802, the cross builder module 804, the cross simplifier module 806, the trace generator module 810, the count module 808, the restriction module 820, and the map generator module 822.

The second control unit 734 of FIG. 7 can execute the second software 742 for the junction module 802 to identify the road segment 210. The second control unit 734 can execute the second software 742 for the cross builder module 804 to generate the intersection 208. The second control unit 734 can execute the second software 742 for the cross simplifier module 806 to generate the simpler instance of the intersection 208. The second control unit 734 can execute the second software 742 for the trace generator module 810 to generate the travel trace 410. The second control unit 734 can execute the second software 742 for the count module 808 to generate the trace count 412. The second control unit 734 can execute the second software 742 for the restriction module 820 to determine the turn restriction 206. The second control unit 734 can execute the second software 742 for the map generator module 822 to generate the trace supported map 602.

The modules of the navigation system 100 can be partitioned between the first software 726 and the second software 742. For example, the second software 742 can include the junction module 802, the cross builder module 804, the cross simplifier module 806, the count module 808, and the restriction module 820. The second control unit 734 can execute modules partitioned on the second software 742 as previously described.

The first software 726 can include the trace generator module 810 and the map generator module 822. Based on the size of the first storage unit 714 of FIG. 7, the first software 726 can include additional modules of the navigation system 100. The first control unit 712 can execute the modules partitioned on the first software 726 as previously described.

The first control unit 712 can operate the first communication unit 716 of FIG. 7 to send the travel trace 410 to the second device 106. The first control unit 712 can operate the first software 726 to operate the location unit 720 of FIG. 7. The second communication unit 736 of FIG. 7 can send the turn restriction 206 to the first device 102 through the communication path 104 of FIG. 7.

The navigation system 100 describes the module functions or order as an example. The modules can be partitioned differently. For example, the restriction module 820 and the map generator module 822 can be combined. Each of the modules can operate individually and independently of the other modules.

It has been discovered that the navigation system 100 can determine the turn restriction 206 to generate the trace supported map 602. The determination of the turn restriction 206 and the generation of the trace supported map 602 eliminates the shortcomings of the default map 202 with OSM data. As a result, the navigation system 100 can generate accurate guidance for the safer operation of the navigation system 100 and the vehicle.

Furthermore, data generated in one module can be used by another module without being directly coupled to each other. For example, the count module 808 can receive the intersection 208 from the cross simplifier module 806 directly. The junction module 802, the cross builder module 804, the cross simplifier module 806, the trace generator module 810, the count module 808, the restriction module 820, and the map generator module 822 can be implement in as hardware (not shown) within the first control unit 712, the second control unit 734, or special hardware (not shown) in the first device 102 or the second device 106.

Figure 9:
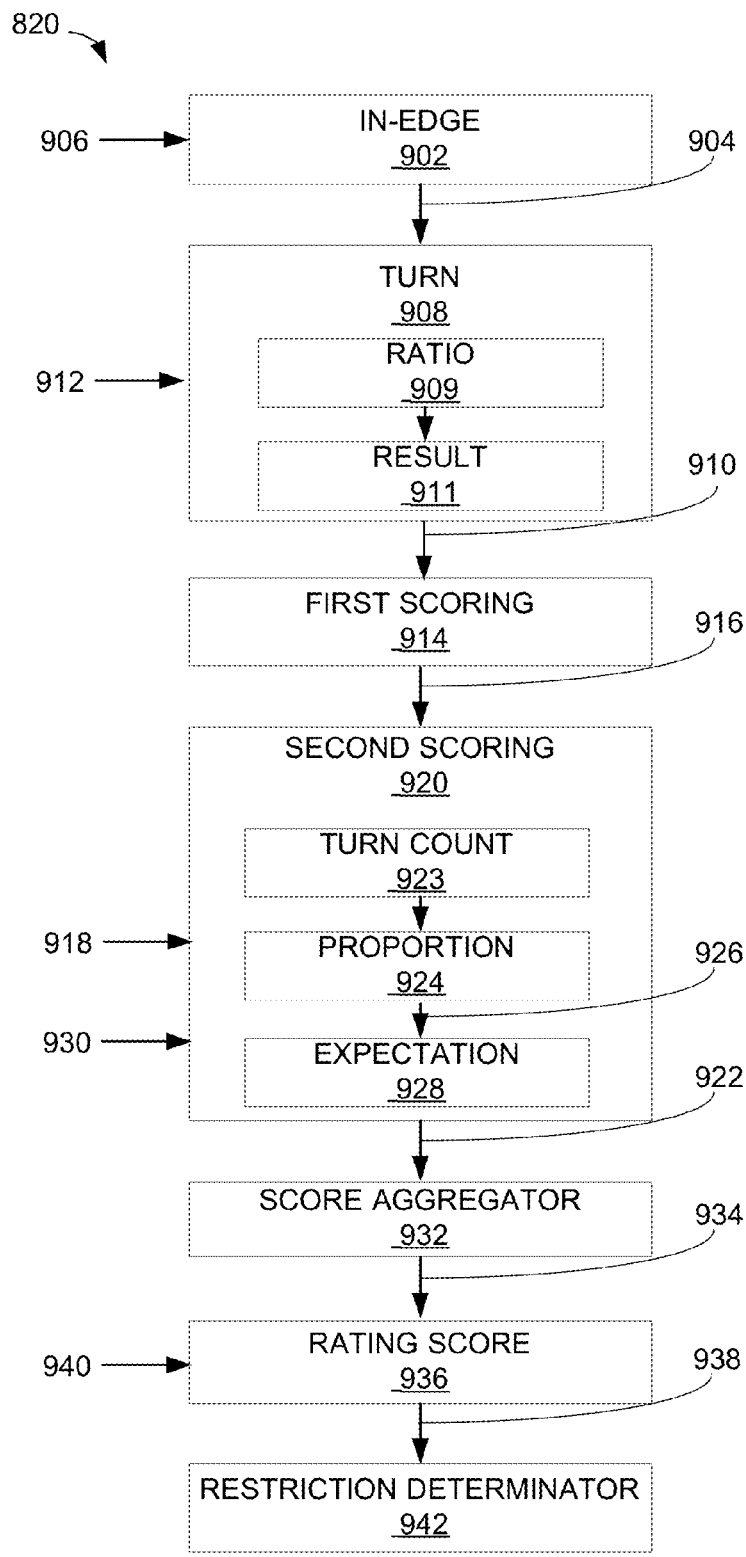
FIG. 9 is a control flow of the restriction module.

Referring now to FIG. 9, therein is shown a control flow of the restriction module 820. The restriction module 820 can include an in-edge module 902. The in-edge module 902 generates a count result 904. For example, the in-edge module 902 can generate the count result 904 based on the trace count 412 of FIG. 4 meeting or exceeding a count threshold 906.

The count threshold 906 is defined a limit placed on the value of the trace count 412 required. For example, the count threshold 906 can represent a minimum number of the travel trace 410 of FIG. 4 required to consider whether the travel trace 410 collected can be reliable for determining the turn restriction 206 of FIG. 2. For further example, the count threshold 906 can represent the minimum number of the travel trace 410 required for the in-edge traffic 402 of FIG. 4. The count result 904 is defined as an outcome of the comparison between the trace count 412 to the count threshold 906. For example, the count result 904 can represent a Boolean result of "true" or "false."

For example, the count threshold 906 can be set to 200 instances of the travel trace 410 for the in-edge traffic 402 from point A to point E. If the trace count 412 for the in-edge traffic 402 can represent 500, the in-edge module 902 can generate the count result 904 of "true." In contrast, if the trace count 412 is less than the count threshold 906, the in-edge module 902 can generate the count result 904 of "false." Further, if the count result 904 is "true," the in-edge module 902 can send the count result 904 to a turn module 908 for further analysis. However, if the count result 904 is "false," the analysis to determine whether the turn restriction 206 at the intersection 208 of FIG. 2 exists can end as insufficient number of travel trace 410 was collected to make a reliable determination.

It has been discovered that the navigation system 100 of FIG. 1 comparing the trace count 412 to the count threshold 906 improves the accuracy for the determination of the turn restriction 206. By increasing the count threshold 906, a larger sample of the travel trace 410 is required to consider the trace count 412. As a result, by having larger sample of the travel trace 410, accuracy to determine the turn restriction 206 improves for the safer operation of the navigation system 100 and the vehicle.

The restriction module 820 can include a turn module 908, which can be coupled to the in-edge module 902. The turn module 908 generates a turn result 910. For example, the turn module 908 can generate the turn result 910 based on the turn proportion 418 of FIG. 4 less than a proportion threshold 912.

The proportion threshold 912 is defined as a limit placed on the value of the turn proportion 418 required. For example, the proportion threshold 912 can represent the maximum ratio permitted between the trace count 412 for the out-edge traffic 404 of FIG. 7 to the trace count 412 for the in-edge traffic 402. The turn result 910 is defined as the outcome of the comparison between the turn proportion 418 to the proportion threshold 912. For example, the turn result 910 can represent a Boolean result of "true" or "false."

The turn module 908 can include a ratio module 909. The ratio module 909 calculates the turn proportion 418. For example, the ratio module 909 can calculate the turn proportion 418 by dividing the trace count 412 for the out-edge traffic 404 by the trace count 412 of the in-edge traffic 402. The ratio module 909 can send the turn proportion 418 to a result module 911.

The turn module 908 can include the result module 911, which can be coupled to the ratio module 909. The result module 911 generates the turn result 910. For example, the result module 911 can generate the turn result 910 based on comparing the turn proportion 418 to the proportion threshold 912. For example, the proportion threshold 912 can be set to one to one ratio between the trace count 412 of the out-edge traffic 404 to the trace count 412 of the in-edge traffic 402. The mathematical formula can represent "proportion of ED/AE" where "ED" can represent the trace count 412 of the out-edge traffic 404 from point E to point D and "AE" can represent the trace count 412 of the in-edge traffic 402 from point A to point E.

If the turn proportion 418 is less than one, the result module 911 can generate the turn result 910 of "true." More specifically, if the trace count 412 for the out-edge traffic 404 is less than the trace count 412 for the in-edge traffic 402, the likelihood of the existence of the turn restriction 206 can increase. The likelihood can increase, because traffic flow from the in-edge traffic 402 could be limited by the turn restriction 206 to continue on to the out-edge traffic 404.

In contrast, if the turn proportion 418 is greater than one, the result module 911 can generate the turn result 910 of "false." More specifically, if the trace count 412 for the out-edge traffic 404 is greater than the trace count 412 for the in-edge traffic 402, the likelihood of the existence of the turn restriction 206 can decrease. The likelihood can decrease, because traffic flow from the in-edge traffic 402 may not be limited by the turn restriction 206 to continue on to the out-edge traffic 404.

If the turn result 910 is "true," the turn module 908 can send the turn result 910 to a first scoring module 914 for further analysis. However, if the turn result 910 is "false," the analysis to determine whether the turn restriction 206 at the intersection 208 exists can end as the likelihood of the turn restriction 206 existing can be low.

It has been discovered that the navigation system 100 comparing the turn proportion 418 to the proportion threshold 912 improves the accuracy for determining the turn restriction 206. By decreasing the proportion threshold 912, a smaller proportion of the turn proportion 418 is required to meet the higher threshold of the proportion threshold 912 being decreased. As a result, by having the smaller value of the turn proportion 418 to pass the proportion threshold 912, accuracy to determine the turn restriction 206 improves for the safer operation of the navigation system 100 and the vehicle.

The restriction module 820 can include the first scoring module 914, which can be coupled to the turn module 908. The first scoring module 914 calculates a proportion score 916. For example, the first scoring module 914 can calculate the proportion score 916 based on the turn proportion 418.

The proportion score 916 is defined as a discounted value of the turn proportion 418. More specifically, even though the trace count 412 for the out-edge traffic 404 can be low, the inference that the turn restriction 206 can exist based on the low number of the trace count 412 can lead to unreliable information. To avoid the unreliability, the first scoring module 914 can calculate the proportion score 916 by multiplying the turn proportion 418 with an out-edge traffic factor 918.

The out-edge traffic factor 918 is defined as a value to discount the turn proportion 418. For example, the out-edge traffic factor 918 can be set to 0.2, thus, discounting the turn proportion 418 by 80%. Subsequently, the first scoring module 914 can calculate the proportion score 916 by multiplying the out-edge traffic factor 918 and by 100 to normalize the value. For example, the mathematical formula can represent "proportion(ED/AE)*100*out-edge traffic factor 918." The first scoring module 914 can send the proportion score 916 to a second scoring module 920.

It has been discovered that the navigation system 100 factoring the out-edge traffic factor 918 improves the accuracy for the determination of the turn restriction 206. By adjusting the out-edge traffic factor 918, the determination of whether a low number of the trace count 412 can be used to control the inference of the existence of the turn restriction 206. As a result, the greater control of the out-edge traffic factor 918 can improve the accuracy for inferring the turn restriction 206 for the safer operation of the navigation system 100 and the vehicle.

The restriction module 820 can include the second scoring module 920, which can be coupled to the first scoring module 914. The second scoring module 920 calculates an expectation score 922. For example, the second scoring module 920 can calculate the expectation score 922 based on the total trace number 414 of FIG. 4.

The expectation score 922 is defined as a discounted value of the expected turn count 416 of FIG. 4. More specifically, the expected turn count 416 can be discounted to factor in the turn proportion 418 discussed above. Details will be discussed below.

The second scoring module 920 can include a turn count module 923. The turn count module 923 calculates the expected turn count 416. For example, the turn count module 923 can calculate the expected turn count 416 based on multiplying the trace count 412 for the in-edge traffic 402 to the ratio between the trace count 412 for the out-edge traffic 404 divided by the total trace number 414.

For a specific example, the turn count module 923 can calculate the total trace number 414 by aggregating the plurality of the travel trace 410 for the plurality of out-edge traffic 404 flowing from the intersection 208. The mathematical formula can represent "S=count(EA)+count (EB)+count (EC)+count (ED) where "S" can represent the total trace number 414. "count(EA)," for example, can represent the trace count 412 for the out-edge traffic 404 from point E to point A.

For a specific example, the total trace number 414 can be 530 records as discussed in FIG. 4. The mathematical formula can represent "expectedCount(AE,ED)=count(AE)*(count (ED)/S)" where "expectedCount(AE,ED)" can represent the expected turn count 416. The trace count 412 for the in-edge traffic 402 from point A to point E can be 500. And the trace count 412 from point E to point D can represent 100. Out of the 100, the trace count 412 for the out-edge traffic 404 for the traffic flow from point A to point E to point D can represent 70. The expected turn count 416 can be for from point A to Point E to point D. The turn count module 923 can calculate the expected turn count 416 by calculating the following: 500*(100/530). The expected turn count 416 can represent 94. The turn count module 923 can send the expected turn count 416 to a proportion module 924.

The second scoring module 920 can include the proportion module 924, which can be coupled to the turn count module 923. The proportion module 924 calculates an expected proportion 926, which is defined as a ratio between the expected turn count 416 and the trace count 412. The mathematical formula can represent "count(AE,ED)/expectedCount(AE, ED). For example, the expected proportion 926 can be calculated by dividing the trace count 412 of the out-edge traffic 404 flowing from point A to point E to point D by the expected turn count 416 for the out-edge traffic 404 from point A to point E to point D. Continuing with the previous example, the expected proportion 926 can be 70/94 or 0.74. The proportion module 924 can send the expected proportion 926 to an expectation module 928.

The second scoring module 920 can include the expectation module 928, which can be coupled to the proportion module 924. The expectation module 928 calculates the expectation score 922. For example, the expectation module 928 can calculate the expectation score 922 by multiplying the expected proportion 926 to an expected turn count factor

930. The mathematical formula can represent "(100−((count(AE,ED)/expectedCount(AE,ED))*100))=the expectation score 922."

The expected turn count factor 930 is defined as a value to discount the expected proportion 926. For example, the expected turn count factor 930 can be set to 0.8, thus, discounting the expected proportion 926 by 20%. Subsequently, the expectation module 928 can calculate the expectation score 922 by the following equation: (100−(expected proportion 926*100))*the expected turn count factor 930. Continuing from the previous example, the expectation score 922 can be 20.4. The second scoring module 920 can send the expectation score 922 to a score aggregator module 932.

It has been discovered that the navigation system 100 calculating for the expected proportion 926 can improve the accuracy of the inference for determining the existence of the turn restriction 206. Factoring of the trace count 412 for the out-edge traffic 404 outflowing from multiple instances of the in-edge traffic 402 improves the accuracy of the sample size of the travel trace 410 considered for inferring the turn restriction 206. As a result, the restriction module 820 can improve the accuracy for determining the turn restriction 206 for safer operation of the navigation system 100 and the vehicle.

The restriction module 820 can include the score aggregator module 932, which can be coupled to the second scoring module 920. The score aggregator module 932 calculates a total score 934. For example, the score aggregator module 932 can calculate the total score 934 by adding the proportion score 916 and the expectation score 922. The score aggregator module 932 can send the total score 934 to a rating score module 936.

The restriction module 820 can include the rating score module 936, which can be coupled to the score aggregator module 932. The rating score module 936 generates a restriction result 938. For example, the rating score module 936 can generate the restriction result 938 based on the total score 934 meeting or exceeding a restriction score 940.

The restriction result 938 is defined as an outcome of the comparison between the total score 934 and the restriction score 940. For example, the restriction result 938 can represent a Boolean result of "true" or "false." If the total score 934 is greater than the restriction score 940, the restriction result 938 can be "true." In contrast, if the total score 934 is less than the restriction score 940, the restriction result 938 can be "false."

The restriction score 940 is defined as a limit of value placed on the total score 934 required. For example, the restriction score 940 can represent a minimum limit required to determine that the turn restriction 206 exists. For example, the restriction score 940 can be set to 85. The restriction score 940 can be adjusted to be higher or lower. As a result, the minimum limit required for the total score 934 can be increased or decreased to determine whether the turn restriction 206 exists or not. More specifically, the total score 934 greater than 85 out 100 can result in the rating score module 936 generating the restriction result 938 of "true." Further, the total score 934 for each combination of the in-edge traffic 402 and the out-edge traffic 404 can be ranked relative to the maximum score of 100.

Continuing from the previous example, the proportion score 916 was 20 and the expectation score 922 was 20.4. As a result, the total score 934 can 40.4. By comparing to the total score 934 to the restriction score 940, the rating score module 936 can generate the restriction result 938 to be "false." The rating score module 936 can send the restriction result 938 to a restriction determinator module 942.

It has been discovered that the navigation system 100 comparing the total score 934 to the restriction score 940 improves the accuracy for determining the turn restriction 206. By increasing the restriction score 940, the total score 934 required may be higher in order to determine whether the turn restriction 206 can exist at the intersection 208. As a result, the accuracy for the determination of the turn restriction 206 improves the navigation system 100 providing navigation guidance that does not violate the turn restriction 206 for the safer operation of the navigation system 100 and the vehicle.

The restriction module 820 can include the restriction determinator module 942, which can be coupled to the rating score module 936. The restriction determinator module 942 determines whether the turn restriction 206 exists or not at the intersection 208. For example, the restriction determinator module 942 can determine the turn restriction 206 based on the restriction result 938.

Continuing from the previous example, the restriction result 938 was "false." More specifically, the restriction result 938 was for the traffic flow from point A to point E to point D. As a result, the restriction determinator module 942 can determine that the turn restriction 206 does not exist for the in-edge traffic 402 and the out-edge traffic 404 from point A to point E to point D.

The restriction module 820 can perform the above process steps for each combination of the traffic flow to determine various instances of the turn restriction 206. For example, the restriction module 820 can determine the turn restriction 206 for the in-edge traffic 402 from point A to point E and the out-edge traffic 404 from point E to point B.

Figure 10:
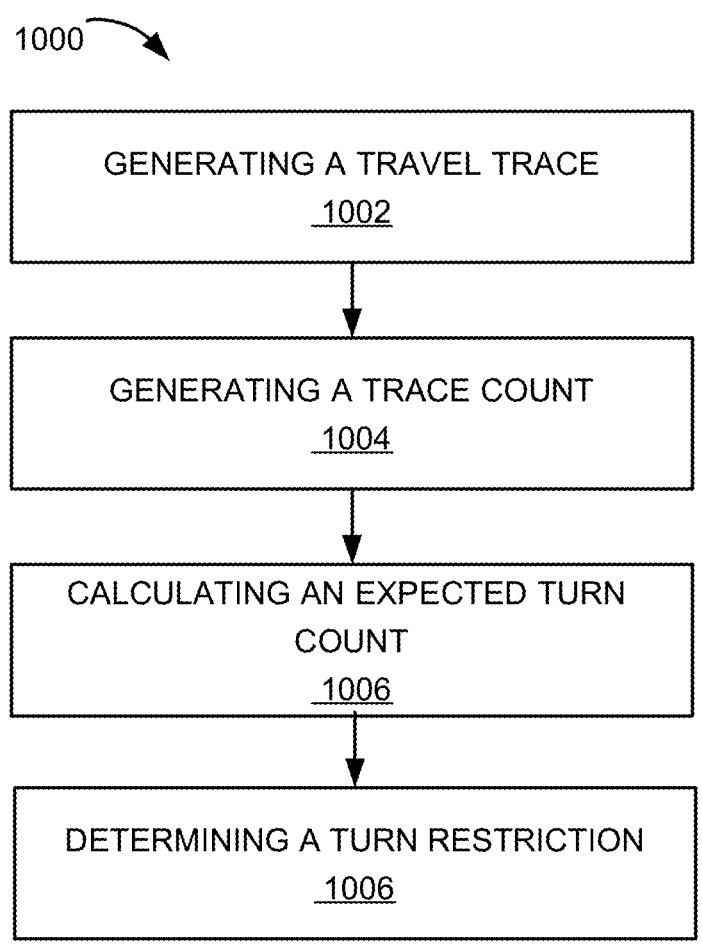
FIG. 10 is a flow chart of a method of operation of the navigation system of FIG. 1 in a further embodiment of the present invention.

Referring now to FIG. 10, therein is shown a flow chart of a method 1000 of operation of the navigation system 100 of FIG. 1 in a further embodiment of the present invention. The method 1000 includes: generating a travel trace for identifying a traffic direction flowing through an intersection in a block 1002; generating a trace count based on aggregating the plurality of the travel trace in a block 1004; calculating an expected turn count based on the trace count for estimating an out-edge traffic flowing from an in-edge traffic in a block 1006; and determining a turn restriction based on the expected turn count for identifying the turn restriction at the intersection for displaying on a device in a block 1008.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:

generating a travel trace for user's move through an intersection, the travel trace corresponding to an in-edge traffic and an out-edge traffic for traversing through the intersection;

generating a trace count based on aggregating a plurality of the travel trace;

calculating a total trace number by aggregating a plurality of the travel trace for a plurality of the in-edge traffic, the out-edge traffic, or a combination thereof;

calculating an expected turn count with a control unit based on the trace count, the in-edge traffic, the out-edge traffic, the total trace number, or a combination thereof;

determining a turn restriction based on the expected turn count for identifying the turn restriction at the intersection for displaying on a device.

2. The method as claimed in claim 1 further comprising generating a count result based on the trace count meeting or exceeding a count threshold.

3. The method as claimed in claim 1 further comprising generating a turn result based on a turn proportion of the trace count being less than a proportion threshold.

4. The method as claimed in claim 1 further comprising calculating a proportion score based on factoring an out-edge traffic factor to a turn proportion of the trace count for determining the turn restriction.

5. The method as claimed in claim 1 further comprising generating a turn proportion based on the trace count of the out-edge traffic relative to the trace count of the in-edge traffic.

6. A method of operation of a navigation system comprising:

generating a travel trace for representing a user's movement through an intersection, the travel trace corresponding to an in-edge traffic and an out-edge traffic for traversing through the intersection;

generating a trace count based on aggregating a plurality of the travel trace for representing multiple movements through the intersection;

calculating a total trace number by aggregating a plurality of the travel trace for a plurality of the out-edge traffic, the in-edge traffic, or a combination thereof;

calculating an expected turn count with a control unit based on multiplying the trace count of the in-edge traffic with a ratio between the trace count of the out-edge traffic and the total trace number;

calculating an expected proportion based on the trace count and the expected turn count; and determining a turn restriction based on the expected proportion for identifying the turn restriction at the intersection for displaying on a device.

7. The method as claimed in claim 6 further comprising generating a trace supported map by importing the turn restriction for displaying on the device.

8. The method as claimed in claim 6 wherein calculating the expected proportion includes calculating the expected proportion based on dividing the trace count by the expected turn count.

9. The method as claimed in claim 6 further comprising:

calculating a proportion score based on factoring an out-edge traffic factor to a turn proportion for determining the turn restriction;

calculating an expectation score based on factoring an expected turn count factor;

calculating a total score based on aggregating the proportion score and the expectation score; and wherein determining the turn restriction includes:

generating a restriction result based on the total score meeting or exceeding a restriction score.

10. The method as claimed in claim 6 further comprising calculating a total trace number based on aggregating the trace count of the travel trace for the out-edge traffic.

11. A navigation system comprising:

a communication unit configured to provide a travel activity record for representing a user's movement based on a location unit; and a control unit, coupled to the communication unit, configured to:

generate a travel trace based on the travel activity record for representing the user's movement through an intersection, the travel trace corresponding to an in-edge traffic and an out-edge traffic for traversing through the intersection;

generate a trace count based on aggregating a plurality of the travel trace;

calculate a total trace number by aggregating a plurality of the travel trace for a plurality of the out-edge traffic, the in-edge traffic, or a combination thereof;

calculate an expected turn count based on the trace count, the in-edge traffic, the out-edge traffic, the total trace number, or a combination thereof; and determine a turn restriction based on the expected turn count for identifying the turn restriction at the intersection for displaying on a device.

12. The system as claimed in claim 11 wherein the control unit is configured to generate a count result based on a trace count meeting or exceeding a count threshold.

13. The system as claimed in claim 11 wherein the control unit is configured to generate a turn result based on a turn proportion of the trace count being less than a proportion threshold.

14. The system as claimed in claim 11 wherein the control unit is configured to calculate a proportion score based on factoring an out-edge traffic factor to the turn proportion of the trace count for determining the turn restriction.

15. The system as claimed in claim 11 wherein the control unit is configured to generate a turn proportion based on the trace count of the out-edge traffic relative to the trace count of the in-edge traffic.

16. The system as claimed in claim 11 wherein the control unit is configured to:

generate the trace count based on aggregating the plurality of the travel trace for representing multiple movements through the intersection;

calculate an expected proportion based on the trace count and the expected turn count;

calculate the expected turn count based on multiplying the trace count of the in-edge traffic with a ratio between the trace count of the out-edge traffic and the total trace number; and determine the turn restriction based on the expected proportion for identifying the turn restriction at the intersection for displaying on the device.

17. The system as claimed in claim 16 wherein the control unit is configured to generate a trace supported map by importing the turn restriction for displaying on the device.

18. The system as claimed in claim 16 wherein the control unit is configured to calculate the expected proportion based on dividing the trace count by the expected turn count.

19. The system as claimed in claim 16 wherein the control unit is configured to:

calculate a proportion score based on factoring an out-edge traffic factor to a turn proportion for determining the turn restriction;

calculate an expectation score based on factoring an expected turn count factor;
calculate a total score based on aggregating the proportion score and the expectation score; and
generate a restriction result based on the total score meeting or exceeding a restriction score.

20. The system as claimed in claim 16 wherein the control unit is configured to calculate a total trace number based on aggregating the trace count of the travel trace for the out-edge traffic.

* * * * *